United States Patent [19]

Bijleveld et al.

[11] 3,727,379
[45] Apr. 17, 1973

[54] PROCESS FOR THE PURIFICATION OF GASES AND VAPORS

[75] Inventors: Eduard Bijleveld, Soest; Jan Cleij, Baarn, both of Netherlands

[73] Assignee: N. V. Octrooien Maalschappij Activit, Amsterdam, Netherlands

[22] Filed: Apr. 17, 1972

[21] Appl. No.: 244,884

Related U.S. Application Data

[63] Continuation-in-part of Ser. No. 42,486, June 1, 1970, abandoned.

[30] Foreign Application Priority Data

June 4, 1969 Netherlands ........................6908458

[52] U.S. Cl..........................................55/73, 55/74
[51] Int. Cl. ..............................................B01d 53/02
[58] Field of Search ......................23/2.1, 25; 55/59, 55/68, 73, 74, 387; 210/32

[56] References Cited

UNITED STATES PATENTS

| | | | |
|---|---|---|---|
| 3,357,158 | 12/1967 | Hollis | 55/67 |
| 3,420,773 | 1/1969 | Selmeczi | 210/32 |
| 3,429,104 | 2/1969 | Hirsfield | 55/74 |
| 3,498,026 | 3/1970 | Messinger et al. | 55/73 |

*Primary Examiner*—Charles N. Hart
*Attorney*—Alvin Sinderbrand et al.

[57] ABSTRACT

Impurities are removed from gases or vapors, for example, from air polluted with the impurities to be removed, by contacting the gas or vapor with a macroporous insoluble crosslinked copolymer of styrene and divinylbenzene in the form of beads or granules having a specific surface area of at least 10 $m^2/g$ and containing polar and polarizable non-dissociable active groups selected from the class consisting of halogen and nitro- and acetyl-groups.

9 Claims, No Drawings

PROCESS FOR THE PURIFICATION OF GASES AND VAPORS

This application is a continuation-in-part of our pending U.S. Patent application Ser. No. 42,486, filed June 1, 1970 and now abandoned.

This invention relates generally to the purification of gases and vapors with the aid of polymeric adsorbents.

The term purification of gases and vapors is intended here to refer to the removal therefrom of undesirable components, and also the recovery therefrom of particular components and, furthermore, the separation of gas mixtures into their component parts.

The purification of gases and vapors is known to be effected with the aid of activated carbon, substantially in the form of granules. This carbon has the disadvantage that it is difficult to regenerate, because the substances adsorbed cannot be removed in a simple manner. It is true that, if the carbon is reburned, it can be considerably reactivated, but this is a difficult and costly process. Moreover, the mechanical properties of granulated carbon are such that both during its use as a sorption agent and during reactivation considerable losses will occur.

Also known for use as adsorbents are insoluble porous copolymers, such as porous styrene-divinylbenzene copolymers, for example, as disclosed in U.S. Pat. No. 3,357,158. These copolymers are usually employed in the form of granules or beads and, in that form, have satisfactory mechanical properties. However, the porous styrene-divinylbenzene copolymers, as such, have only limited applicability to the adsorption of impurities from gases and vapors due to their low binding affinity for most substances, and in particular for polar substances, to be removed from gases and vapors. In general, it can be said that, the more polar the substance to be removed from a gas or vapor, the less will be the adsorption capacity of the styrene-divinylbenzene copolymers with respect to such substances. For example, the adsorption capacity of styrene-divinylbenzene copolymer with respect to methanol is only 3g. of methanol per kg. of the adsorbent, and the adsorption capacity is even further reduced with respect to $SO_2$ to only about 1g. of $SO_2$ per kg. of styrene-divinylbenzene copolymer. Therefore, styrene-divinylbenzene copolymers, as such are hardly of any use for the purification of gases or vapors and have only been employed in chromatographic separations where their low adsorption capacities, particularly as to polar substances, can be tolerated.

It has further been proposed, for example, in U.S. Pat. No. 3,409,691, to employ sulphonated macroporous styrene-divinylbenzene copolymer for the selective absorption of polar organic species from a non-aqueous liquid or gaseous mixture with a less polar species. However, such sulfonated copolymers can only be used in the dry form for absorption from nonaqueous gaseous mixtures. Since the active groups of the sulfonated copolymers have hydrogen-bridge-forming properties, they will have a strong preference for the absorption of water and thus are not suitable for the removal of organic species from gases which also contain water vapor.

Accordingly, it is an object of this invention to provide a process of wide application for the removal of impurities from gases or vapors.

More particularly, it is an object of this invention to provide a process by which any of a relatively wide range of impurities, including polar substances, can be efficiently removed from gases or vapors which may include water vapor.

This invention is based on the surprising discovery that gases and vapors, including water vapor, can be efficiently purified, even if the impurities contained therein are polar, by contacting the polluted gases or vapors with a macroporous insoluble crosslinked copolymer of styrene and divinylbenzene which contains polar or polarizable, non-dissociable active groups selected from the group consisting of halogen and nitro- and acetyl-groups.

The polymeric compounds used in accordance with the invention are preferably employed in the form of granules. The granules as a rule measure between 0.1 and 2 mm. in diameter. For use in columns, an average particle size of about 0.8 mm. has been found very satisfactory.

The above-mentioned active groups may be contained in the starting materials, for example, the mentioned monomers, from which the crosslinked polymeric compound is prepared or they may be introduced into the polymeric compounds after the preparation thereof. For the preparation of the macroporous crosslinked polymeric compounds and the introduction, if required, of active groups, reference may be made to Houbenweyl, Methoden der Organische Chemie, Band XIV, Vol. 1 and 2 (1963) and J. Seidle et al, Adv. Polymer Science 5, 113 (1967), and also to the methods disclosed in U.S. Pat. Nos. 3,147,214 and 3,201,357 and in British Patents No. 849,122, No. 860,695, No. 894,391 and No. 932,125. It is preferred that the active groups be introduced into the final copolymer. In this way all attention can be given to the preparation from the monomers of the macroporous matrix without this preparation being influenced by the presence of the active groups. The preparation may then be followed by the introduction of the active group desired, for instance, a halogen, nitro- or acetyl-group.

It is preferred to use adsorbents having, as the basis thereof, macroporous copolymers of styrene crosslinked with 2 to 80 percent by weight of divinylbenzene.

Although the adsorbents used according to the invention may contain, as mentioned above, polar or polarizable non-dissociable, active groups selected from the class consisting of the halogen-, nitro-, and acetyl-groups, it is preferred to use adsorbents that contain the nitro-group as these have been found to have the highest adsorption capacities in most cases.

In view of their high mechanical and chemical stability and their being readily regenerable, the adsorbents in the form of granules or beads are particularly suitable to be employed in columns, in fluidized beds and in continuous apparatus, in which the particles are continuously transported in counter current flow to the feed direction of the gas or vapor to be purified, with the saturated adsorbent being continuously discharged and continuously or discontinuously regenerated, and with fresh or regenerated adsorbent being continuously supplied.

Among the impurities to be removed from the air or gas may be mentioned: sulphur dioxide, hydrogen sulfide, mercaptans, aromatic compounds such as benzene, toluene, and xylene, alcohols such as methanol, ethanol, and butanol, ketones such as acetone and butanone, ethers and esters, ammonia and amines, and saturated and unsaturated hydrocarbons such as butane, hexane, heptane, butene, butadiene and acetylene. It should be noted that the presence of water vapor in the air or gas to be purified does not have a detrimental effect on the adsorption capacity of the particular copolymers used in accordance with this invention.

The above-mentioned adsorbents can be regenerated in a simple manner. Adsorbed substances that can readily be converted into ions may be removed from the adsorbent with the aid of acidic or alkaline solutions, for instance, when removing $SO_2$ or amines. Organic impurities may be removed either by extraction from the column, or by heating the column above the boiling point of the organic impurities. For organic substances having a relatively high boiling point, it will generally be preferred to apply extraction and for substances having a relatively low boiling point preference will be given to heating.

The adsorbents mentioned may, with advantage, be used for the purification of gases and vapors before they are discharged into the atmosphere. This is of particular importance in view of the increasing demands made on the prevention of air pollution. Moreover, in chemical and petrochemical plants the above adsorbents may with advantage be used for a great many gas purifications.

The adsorbents according to the invention make it possible to obtain an adsorption capacity which, particularly in the case of polar impurities, is many times that of the corresponding copolymers that do not contain the mentioned active groups. This will be illustrated in the following examples.

As already mentioned, the adsorbents according to the invention are based on macroporous crosslinked copolymers. The term "macroporous" is used herein, as in the art to which this invention relates; to distinguish the crosslinked copolymers, on which the adsorbents of the present invention are based from the prior art geltype crosslinked copolymers having only microporosity. Microporosity refers to the distance between the crosslinks and chains of the hydrated polymeric gel structure.

The micropores are of atomic dimensions and usually below 30 A in diameter and are not true pores in the strictest definition of the term. Macroporosity is true porosity and refers to structures in which the pores are larger than atomic dimensions and are not part of the gel structure. Macroporous polymers have both a microporous as well as a macroporous structure, and thus contain a significant nongel porosity or pore volume clearly revealed by mercury porosimetry, that is, have at least pores, which are above 75 A in diameter. Macroporosity is further evident in the specific surface area of the copolymer measured by the BET-$N_2$-method.

The macroporous adsorbents used according to the invention have specific surface areas of at least 10 $m^2/g$. These specific surface areas may be high as 500 $m^2/g$ or more. The pore volume of the adsorbents used is at least 0.05 $cm^3/g$ (Hg-porosimeter) and is usually in the range of 0.1 to 1.0$cm^3/g$.

Very good results are obtained with macroporous polymeric adsorbents having a specific surface area of at least 100 $m^2/g$ and a pore volume of at least 0.3 $cm^3/g$.

The invention will now be described further with reference to the following specific exmaples which are merely illustrative.

EXAMPLE I

The adsorbent used for this example was a nitrated, macroporous polystyrene crosslinked with divinylbenzene which was prepared as follows:

into a 1-liter flask, a solution of 1 g of gelatin and 4 g of glycerin in 400 $cm^3$ water was introduced. In this solution, 2g of finely divided calcium phosphate were dispersed. Subsequently, 55 $cm^3$ of styrene, 55 $cm^3$ of technical divinyl benzene (60 percent divinylbenzene, 38 percent ethylvinylbenzene, and 2 percent diethylbenzene), 90 $cm^3$ of heptane, and 2 g of benzoylperoxide were added, with stirring. The reaction mixture was stirred for 16 hours at 70°C at a speed of 200 r.p.m. When the reaction was completed, the resultant bead-shaped product was freed from heptane by evaporation, after which the beads were dried. The yield was 90g of macroporous crosslinked styrene-divinylbenzene copolymer. The copolymer obtained in this way was nitrated by feeding the beads into a mixture of 810 g of sulfuric acid (96 percent) and 560 g of nitric acid (65 percent) at 5°C. The mixture was subsequently allowed to react at 15° to 20°C for another 4 hours. The nitrated beads were than washed with water and dried. The yield was about 125 grams of macroporous nitrated crosslinked styrene-divinylbenzene copolymer having a specific surface area of 127$m^2/g$ (BET-$N_2$-method) and a pore volume of 0.37 $cm^3/g$ (Hg-porosimeter).

These 125 g. of small, round beads were introduced into a glass tube having an inner diameter of 25 mm. The beads filled the tube over a height of 52 cm, so that the volume of the packed bed of beads was 260 $cm^3$. Through this adsorption column, air polluted with toluene vapor was passed at a rate of 26 liters per hour. The air contained about 75 mg. of toluene per liter. The air supply to the tube was allowed to continue until, at the end of the column, the smell of toluene was noticeable indicating saturation of the adsorbent. The adsorptive power of the adsorbent for toluene was 51 grans of toluene per kilogram of adsorbent. The saturated column was regenerated in a simple way by removing the toluene therefrom by a percolation of methanol therethrough.

EXAMPLE II

Through a column of the same adsorbent as used in Example I, air polluted with methanol vapor (95 mg. of methanol per liter of air) was passed. The adsorption capacity of the adsorbent for the methanol was found to be 29 grams of methanol per kilogram of adsorbent. The adsorbent was regenerated by heating above the boiling point of the methanol. After condensation, 3.64 g of methanol were collected. It was found that the regenerated adsorbent was again capable of adsorbing 29 g of methanol per kg adsorbent.

When the adsorbent in the column was replaced with a macroporous crosslinked copolymer of styrenedivinylbenzene in the form of beads (the intermediate product obtained in the preparation of the adsorbent of Example I), then the adsorption capacity for methanol was found to be about 3 g per kg of copolymer. It is therefore clear that, for the removal of methanol vapor from air, the use of porous copolymers containing nitro groups is of great advantage.

EXAMPLE III

Air polluted with sulfur dioxide (about 100 mg of $SO_2$ per liter of air) was passed through a column packed with 125 g of macroporous nitrated crosslinked styrenedivinylbenzene copolymer in the form of beads prepared in the same way as described in Example I. The adsorption capacity of the adsorbent for $SO_2$ was found to be 66 grams of $SO_2$ per kg of adsorbent. The $SO_2$-saturated column was regenerated by treating it with a 1N NaOH solution.

The adsorption capacity of the intermediate product obtained in the preparation of the adsorbent of Example 1 (that is, the macroporous crosslinked styrenedivinylbenzene copolymer per se) was found to be less than 1 gram of $SO_2$ per kg of adsorbent. This clearly demonstrates the great advantage of the use of macroporous crosslinked styrenedivinylbenzene copolymers containing nitro-groups for the removal of $SO_2$ from air.

EXAMPLE IV

The adsorbent used in this example was a macroporous chlorinated crosslinked styrenedivinylbenzene copolymer prepared as follows:

Ninety grams of crosslinked styrenedivinylbenzene copolymer in the form of beads, prepared as described in Example I, were swollen in 480 $cm^3$ of nitro benzene. To this mixture were then added 5 g of aluminum chloride. Subsequently, at 3° to 6°C, 96 g of chlorine gas were introduced at a rate of 22.5 grams per hour. When the reaction was completed, the beads were isolated from the nitro benzene, washed with water, and dried. The yield was about 125 grams of macroporous chlorinated cross-linked styrenedivinylbenzene copolymer having a specific surface area of 135 $m^2/g$ and a pore volume of 0.41 $cm^3/g$.

This adsorbent was transferred into a glass tube (25 mm in diameter). In this case the length of the column was 55 cm. Toluene-polluted air (75 mg of toluene per liter of air) was passed through the column at a rate of 25 liters per hour. The adsorption capacity of this adsorbent for toluene was found to be 134 grams of toluene per kilogram of adsorbent. The column was regenerated by percolation with methanol.

EXAMPLE V

Through a column packed with the same bead-shaped adsorbent as used in Example IV, there was passed a stream of air charged with chloroform (240 mg of chloroform per liter of air). The adsorption capacity was found to be 86 grams of chloroform per kg of adsorbent. The saturated adsorbent was regenerated by heating the column at a temperature of 70°C, as a result of which it was freed from chloroform.

EXAMPLE VI

The adsorbent used in this example was a macroporous acetylated crosslinked styrenedivinylbenzene copolymer prepared as follows:

Ninety grams of bead-shaped crosslinked styrenedivinylbenzene copolymer prepared as described in Example I were swollen in 225 grams of acetyl chloride. Subsequently, 150 $cm^3$ of petroleum ether (boiling point 40° to 60°C) were added so that the mass could be stirred.

To the mass were added over a period of half an hour, with stirring and at 0°C, 380 g of aluminum chloride together with 450 $cm^3$ of petroleum ether. The reaction was allowed to continue for three more hours, with stirring. The acetylated beads were isolated from the reaction mixture, washed with water, and dried. The yield was 106 grams of macroporous acetylated crosslinked styrenedivinylbenzene copolymer, having a specific surface area of 132 $m^2/g$ and a pore volume of 0.39 $cm^3/g$.

The beads were transferred into a glass tube (25 mm in diameter). The height of the column was 46 cm. Through the column, air polluted with toluene vapor (70 mg of toluene per liter of air) was passed at a rate of 26 liters per hour. The adsorption capacity for toluene was found to be 126 grams per kilogram of adsorbent. The column was regenerated with methanol.

EXAMPLE VII a. In the same way as in Example VI, the adsorbent of Example VI was tested for the removal of n-butanol vapor from air. The air contained 16 mg of n-butanol per liter. The adsorption capacity of this adsorbent for n-butanol was found to be 67 grams per kilogram of adsorbent. The column was regenerated by heating.

b. Example VII(a) was repeated with the adsorbent of Example I, that is, the nitrated copolymer. The adsorption capacity of this adsorbent for n-butanol was found to be 80 grams of n-butanol per kilogram of adsorbent.

c. Example VII(a) was repeated with the adsorbent of Example IV, that is, the chlorinated copolymer, the adsorption capacity of this adsorbent was found to be 65 grams n-butanol per kilogram of adsorbent.

d. The adsorption capacity of the intermediate product of Example I, that is, the macroporous, cross-linked styrenedivinylbenzene copolymer, per se, for n-butanol was found to be 15 grams of n-butanol per kilogram of copolymer.

EXAMPLE VIII

Through a column of the same adsorbent as used in Example IV (that is, the chlorinated copolymer), air polluted with methanol vapor (95 mg of methanol per liter of air) was passed. The adsorption capacity of the adsorbent for the methanol was found to be 16 grams of methanol per kg of adsorbent. The adsorbent was regenerated by heating.

When the adsorbent in the column was replaced with the adsorbent of Example VI (that is, the acetylated copolymer) then the adsorption capacity for methanol was found to be 25 grams per kg of adsorbent.

As already noted in Example II the adsorption capacity of the copolymer per se for methanol is only about 3 g per kg of copolymer.

EXAMPLE IX

Through the regenerated column of each of the adsorbents of the Examples I, IV and VI, after having removed therefrom the methanol by heating, air containing 160 mg of triethylamine per liter was passed at a rate of 24 liters per hour. The adsorption capacities for triethylamine were found to be respectively 87, 50 and 65 grams per kilogram of adsorbent. The column was regenerated by heating in each case.

The adsorption capacity of the copolymer per se (the intermediate product of Example I) for triethylamine was found to be 25 grams per kg of copolymer.

EXAMPLE X

Through a column packed with 125 g of the same adsorbent as used in Example I there was passed a stream of air, which contained about 40 mg of methanol and about 40 mg of toluene per liter, at a rate of 26 liters per hour. When the column was saturated, it was found to have adsorbed 6.1 grams of the toluene-methanol mixture, which corresponds to an adsorption capacity of 49 grams of the toluene-methanol mixture per kilogram of adsorbent. The column was regenerated merely by heating.

What is claimed is:

1. A process for removing impurities from a fluid of the class consisting of gases and vapors, comprising contacting the impurity-laden fluid with an adsorbent consisting essentially of a macroporous insoluble cross-linked copolymer of styrene and divinylbenzene in the form of beads or granules having a specific surface area of at least $10 m^2/g$ and containing polar and polarizable non-dissociable active groups selected from the class consisting of halogen and nitro- and acetyl-groups.

2. The process according to claim 1, in which said copolymer contains from 2 to 80 wt. percent of divinylbenzene and said active groups are nitro- groups.

3. The process according to claim 1, in which said active groups have been substituted into said copolymer.

4. The process according to claim 1, in which said fluid is air.

5. The process according to claim 4, in which said impurity removed from the air by said adsorbent is selected from the group consisting of toluene, methanol, chloroform, n-butanol, acetone, triethylamine and mixtures thereof.

6. The process according to claim 4, in which said impurity removed from the air by said adsorbent is sulfur dioxide.

7. The process according to claim 1, in which said copolymer has a pore volume of at least $0.05 cm^3/g$ (Hg-porosimeter).

8. The process according to claim 7, in which said pore volume is in the range between approximately 0.1 and $1.0 cm^3/g$.

9. The process according to claim 8, in which said specific surface area is at least $100 m^2/g$ and said pore volume is at least $0.3 cm^3/g$.

* * * * *